(12) United States Patent
Beck et al.

(10) Patent No.: US 8,759,716 B2
(45) Date of Patent: Jun. 24, 2014

(54) METHOD AND APPARATUS FOR WELDING WITH LIMITED TERM SOFTWARE

(75) Inventors: Curt J. Beck, Appleton, WI (US); Robert R. Davidson, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 2446 days.

(21) Appl. No.: 11/419,391

(22) Filed: May 19, 2006

(65) Prior Publication Data
US 2007/0267394 A1    Nov. 22, 2007

(51) Int. Cl.
B23K 9/10    (2006.01)

(52) U.S. Cl.
USPC ..................... 219/137.7; 219/130.1

(58) Field of Classification Search
USPC ................. 219/130.1, 130.5, 137.7
See application file for complete search history.

(56) References Cited

U.S. PATENT DOCUMENTS

| 4,459,456 | A | * | 7/1984 | Jurek et al. | 219/110 |
| 4,459,457 | A | * | 7/1984 | Jurek | 219/110 |
| 4,804,811 | A | * | 2/1989 | Raycher et al. | 219/98 |
| 5,386,096 | A | * | 1/1995 | Buda et al. | 219/110 |
| 5,582,750 | A | * | 12/1996 | Hamura et al. | 219/124.34 |
| 6,013,892 | A | * | 1/2000 | Buda et al. | 219/110 |
| 6,087,626 | A | | 7/2000 | Hutchison et al. | |
| 6,329,636 | B1 | | 12/2001 | Geissler | |
| 6,639,182 | B2 | * | 10/2003 | Hayes | 219/130.5 |
| 6,828,522 | B2 | * | 12/2004 | Hochhalter et al. | 219/86.32 |
| 2004/0074877 | A1 | * | 4/2004 | Hochhalter et al. | 219/86.41 |

OTHER PUBLICATIONS

Miller® Axcess 450,OM-211 434C, Jan. 2004 Controlled Metal Transfer (CMT) 2004.
Axcess™ Systems Software Driven Multi-Mig™ Process Platform Jun. 2004.

* cited by examiner

Primary Examiner — Henry Yuen
Assistant Examiner — Ayub Maye
(74) Attorney, Agent, or Firm — George R. Corrigan

(57) ABSTRACT

A method and apparatus for welding uses a power circuit and a controller connected to the power circuit. The controller included a welding program having a limited term. The program may be part of a system, or a stand alone program. The controller has a data port and the welding program and/or an authorization is received by the controller on the data port in one embodiment. The welding program includes a limited time module, a limited time in use module, a limited arc start module, a controlled short circuit program, and/or a pulse program in various embodiments. A second welding program, without a limited term module, may be provided.

5 Claims, 2 Drawing Sheets

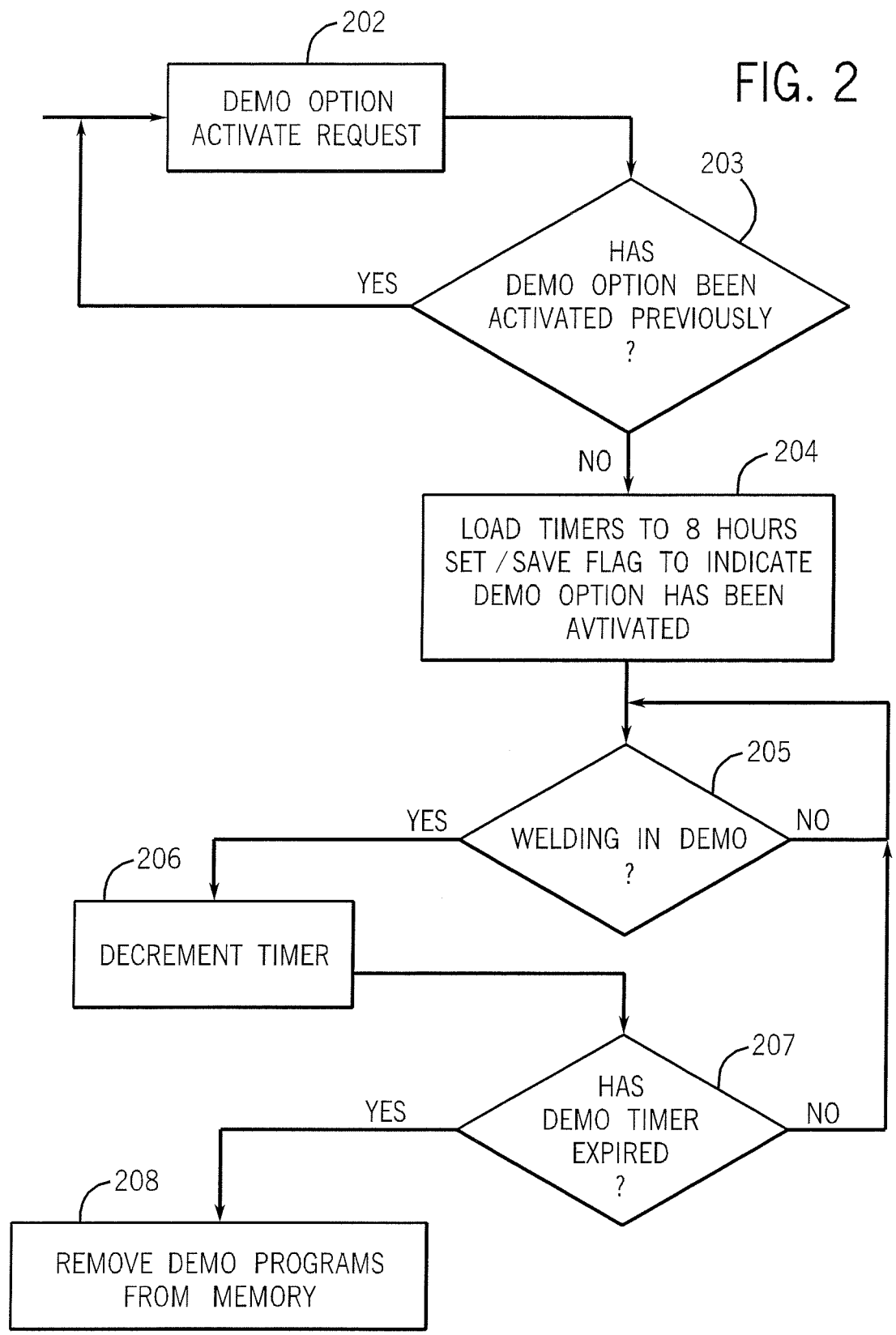

METHOD AND APPARATUS FOR WELDING WITH LIMITED TERM SOFTWARE

FIELD OF THE INVENTION

The present invention relates generally to the art of welding and welding power supplies. More specifically, it relates to welding and welding power supplies where a controller can control the power supply to provide an output suitable for a desired welding process.

BACKGROUND OF THE INVENTION

There are many known types of welding systems used for many different welding processes. Welding system, or system for welding, as used herein, includes one or more of a power source, controller, wire feeder, and a source of gas, it may also include peripherals such as robots etc. Welding power supply, as used herein, includes any device capable of supplying welding power including power circuitry, control circuitry and other ancillary circuitry associated therewith.

Some welding power supplies are dedicated for a single welding process, such as MIG welding, and other welding systems can be used for a variety of processes. The Miller Axcess® welding system is a multi-process machine that can be controlled to provide a number of welding processes such as pulse, controlled short circuit welding, MIG, spray and hybrid processes.

The power circuit and controller of the Axcess® are sufficiently flexible that they can provide power and control for the various processes as good as or better than a system designed for a single process. Moreover, software and hardware allow the user to select a welding program (that can include fixed parameters or user setable parameters). Welding program, as used herein, includes a software routine and/or hardware that causes a welding system or power supply to provide an output suitable for a welding process.

Some customers need a multi-process system such as an Axcess®, while others need a single process system. Accordingly, to address the ends of various market segments, a single system can be sold with different software, interfaces, and/or controls. For example one customer can purchase a system for pulse and spray, while another can purchase the same system, but with additional software to use that system for controlled short circuit welding.

Because advanced systems such as the Axcess® are relatively new, many customers do not fully appreciate the capabilities of some processes, and/or the desirability of a multi-process machine. Thus, a practice developed to allow the user to test or qualify a particular process. For example, a sales person would include a welding program for RMD® (a hybrid controlled short circuit process) when the customer purchased a system. Then, after allowing the customer to try the program for some time (perhaps days or weeks), the customer decided if they wanted to purchase that option. If not, the seals person (or technician) would have to return to the customer's work site, and disable the option (by removing the software, e.g.). Of course, requiring a return visit to disable the feature adds cost, does not provide a definite term for the trial, and generally is inconvenient.

Accordingly, a way to allow the user to test a feature on a welding system that does not require action to disable it is required. Preferably, such a system will provide a definite term for the user to test the option.

SUMMARY OF THE PRESENT INVENTION

According to a first aspect of the invention a welding system includes a power circuit and a controller connected to the power circuit. The controller included a welding program having a limited term.

According to a second aspect of the invention a method of welding includes providing welding power in accordance with a first welding program that has a limited term module and terminating the availability of the first welding program in response to the limited term module.

According to a third aspect of the invention a welding program includes at least one process module and a limited term module.

According to a fourth aspect of the invention a method of providing a welding program test period includes providing a first process module, providing a limited term module and terminating the availability of the first welding program in response to the limited term module.

The controller has a data port and the welding program and/or an authorization is received by the controller on the data port in one embodiment.

The data port may be connectable a pda, a network interface, a robot and/or an internet connection, and be wireless, hardwired and/or a user interface in various embodiments The welding program includes a limited time module, a limited time in use module, a limited arc start module, a controlled short circuit program, and/or a pulse program in various embodiments.

A second welding program, without a limited term module, is provided in another embodiment.

Other principal features and advantages of the invention will become apparent to those skilled in the art upon review of the following drawings, the detailed description and the appended claims.

BRIEF DESCRIPTION OF THE DRAWINGS

FIG. 2 is a flow chart implementing one aspect of the preferred embodiment.

Figure 1:
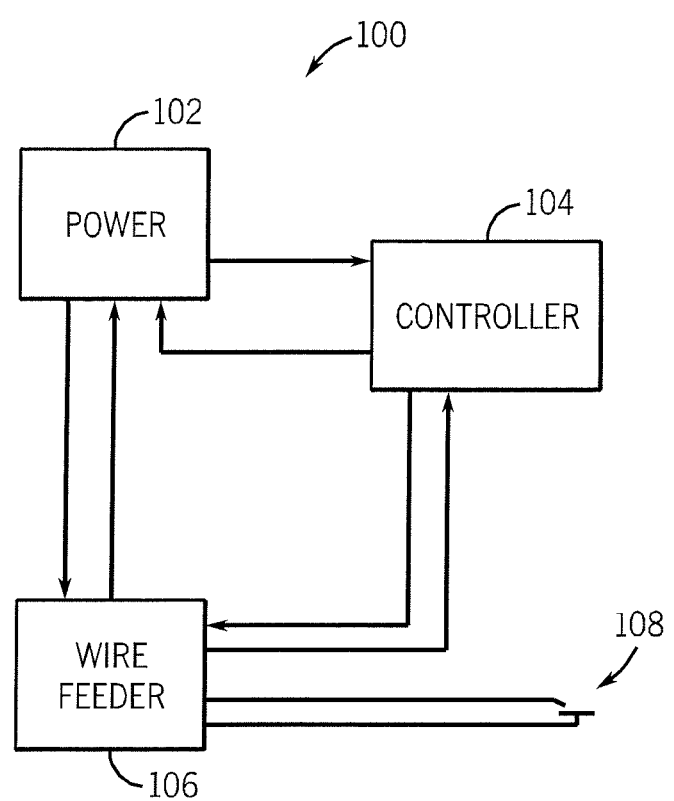
FIG. 1 is a diagram of a welding system in accordance with the preferred embodiment.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular welding system (the Axcess®) and a particular process (RMD®), using a particular flowchart, it should be understood at the outset that the invention can also be implemented with other systems, processes and flow charts.

Generally, the invention provides for providing one or more welding programs that have a limited term. Preferably, the programs limited term is implemented by software that monitors one or more of arc starts (either of a particular process or overall), welding time (either of a particular process or overall), and elapsed time and terminates the availability of the software in response thereto. Limited term, as used herein with respect to software, means the software is unavailable after a selected parameter such as time, usage, number of starts, etc., has been exceeded. Elapsed time, as used herein, includes the time a welding power supply or system is on, or the time it is on and off. Terminating the availability, as used herein with respect to a welding process, includes rendering the software that provides the process inaccessible by the user without help from or permission of a third party such as the manufacturer, salesman, technician, etc.

The welding programs with a limited term are preferably one or more of a pulse program and a short circuit welding program. Controlled short circuit program, as used herein, includes a welding program that implements a controlled short circuit process, or a hybrid process based in part on controlled short circuit welding. Pulse program, as used herein, includes a welding program that implements a pulse process, or a hybrid process based in part on a pulse process.

The limited term program is preferably activated by the user interface, a palm interface, a network interface, or be activated prior to the system being sent to the customer. The activation is for one time only, although other embodiments allow multiple activations (for example, the user could purchase and repurchase a limited term as desired). The activation may be by a software code, a hidden menu, etc.

Referring now to FIG. 1, a system for providing welding power 100 in accordance with the present invention includes a power source 102 and a wire feeder 106, that are controlled by a controller 104 to produce a welding arc 108. The various components may be disposed in separate or common housings, and may be in more than one housing (a portion of controller 104 can share a housing with power source 102, while another portion share a housing with wire feeder 106). A robot may be included if desired.

Controller, as used herein, includes digital and analog circuitry, discrete or integrated circuitry, microprocessors, DSPs, etc., and software, hardware and firmware, located on one or more boards, used to control a device such as a system, power supply or power source. The system is preferably one such similar to a Miller Axcess®, or another networked power source such as that described in U.S. Pat. No. 6,329,636 (hereby incorporate by reference) that implements a welding process in accordance with U.S. Pat. No. 6,087,626 (hereby incorporate by reference). Other than the feature of a limited term welding program, system 100 may be identical to that of the prior art.

The preferred embodiment provides that controller 104 include one or more process modules and a limited term module. The limited term module can be part of a process module, or a welding program, or distinct therefrom, but operates on the program or module. Module, as used herein, includes digital and analog circuitry, and may be hardware or software, that cooperates to perform one or more functions. Process module, as used herein, includes a module that causes the output to be suitable for a selected process. Limited term module, as used herein, is a module that limits the term of itself and/or another software such that the software is unavailable after a selected parameter such as time, usage, number of starts, etc., has been exceeded. After the criteria of the limited term module has been met, the process module is rendered unavailable, such as by deleting, requiring an axcess code, etc.

Preferably the limited term module includes one or more of limited arc start module, limited time in use module, and/or a limited time module. Selected number or time, as used herein, includes a number or time, either overall or for a particular. Limited arc start module, as used herein, includes is a module that limits the term of itself or other software such that the software is unavailable after a selected number of starts, either overall or for a particular process, has been exceeded. Limited time in use module, as used herein, includes is a module that limits the term of itself or other software such that the software is unavailable after a selected length of time the power supply or system is in use, overall or for a particular process, has passed. Limited time module, as used herein, includes is a module that limits the term of itself or other software such that the software is unavailable after a length of time has passed. Selected number or time, as used herein, includes a number or time, either overall or for a particular.

The preferred embodiment provides that the process module available for a limited term be activated via a data port. Specifically, a module process such as a hybrid controlled short circuit module is activated via a pda interface to allow eight hours of welding time with the process. At the end of the eight hours the process is deactivated and removed from memory. This allows the user to decide if they would like to activate the feature, and allows a fixed duration of test/development time to decide if the feature should be purchased. Also, it lets the customer get a feel for options they did not know they needed or existed Various embodiments provide that either the specific process module and limited term module be uploaded to controller 104 via the data port, or an authorization (such as a code) be uploaded via the data port. Data port, as used herein, includes a device or software used to receive data and/or software routines. The data port can be a user interface, network connection etc. User interface, as used herein, includes a welding power supply or system front panel, robot controller interface, pendant, pda, etc.

Referring now to FIG. 2, a flow chart showing one implementation of a limited term module starts at 202 where the user activates the demo option (for example the controlled short circuit module). Then the software determines if the software has been activated previously at 203. If it has been previously activated the routine ends. if not, the routine sets a timer to 8 hours (to allow for 8 hours of welding using the limited term process module) at 204. It is determined of welding using the demo process is being performed at 205. If not, the routine continues to monitor if welding is being performed using the demo process.

If welding using the demo process is being performed then the timer is decremented at 206. After the timer is decremented the routine determines if the timer has reached zero at 207. If not, the routine returns to check if welding in the demo process is being performed. If the timer has reached zero then the demo process program is removed and the demo routine is deactivated at 208.

Other embodiments provide for enabling the demo process by requiring the user to download an activation code, activating by the seller, manufacturer, or other person over the internet, via a robot controller. Also, rather than time welding in the demo process, a number of starts or elapsed number of days (or weeks or hours) could be used to terminate the demo process.

Another embodiment provides that the user can by a process for a limited time. Thus, rather than a demo, it is a limited term, but can be repurchased for use as necessary. The user could pay a periodic license fee such as annual, or rental companies could enable for a rental period. The enabling and limiting can be done as described above with respect to the demo option Also, the invention can be used to provide other limited term programs, such as for arc data monitoring, diagnostics, specialized hardware circuitry (for example circuitry that implements the dp/dt feature of U.S. Pat. No. 6,087,626), communication ports, updates, etc. Generally, any feature could be limited term using the present invention.

Numerous modifications may be made to the present invention which still fall within the intended scope hereof. Thus, it should be apparent that there has been provided in accordance with the present invention a method and apparatus for welding with a limited term feature that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A method of welding comprising: providing a first welding program, wherein the first welding program is available for use and includes a limited term module; providing welding power in accordance with the first welding program; and determining if the first welding program has been previously activated: in response to the determination, if the first welding program has not been previously activated, setting a limited time to run the first welding program; monitoring the period of time the first welding program is running; comparing the monitored time to the limited time; and when the limited is exceeded terminating the availability of the first welding program; and wherein the first welding program includes at least one of a controlled short circuit program and a pulse program.

2. The method of claim 1, further comprising providing a second welding program without a limited term module, and providing welding power in accordance with the second welding program.

3. The method of claim 2, further comprising receiving at least one of the welding program and an authorization on a data port that is part of a welding system.

4. The method of claim 3, further comprising connecting a pda to the data port.

5. The method of claim 4, wherein connecting includes wirelessly connecting.

* * * * *